United States Patent

Kotzin et al.

Patent Number: 5,862,488
Date of Patent: Jan. 19, 1999

[54] METHOD AND MOBILE STATION FOR ACTIVATING A PLAYBACK DEVICE IN A COMMUNICATION SYSTEM

[75] Inventors: Michael D. Kotzin, Buffalo Grove; Philip J. Fleming, Glen Ellyn, both of Ill.

[73] Assignee: Motorola, Inc., Schaumburg, Ill.

[21] Appl. No.: 771,105

[22] Filed: Dec. 20, 1996

[51] Int. Cl.[6] .................................................. H04Q 7/00
[52] U.S. Cl. .......................................... 455/510; 455/528
[58] Field of Search ..................................... 455/412, 415, 455/567, 575, 418, 419, 450, 509, 510, 528, 67.7

[56] References Cited

U.S. PATENT DOCUMENTS

| | | | |
|---|---|---|---|
| 5,193,209 | 3/1993 | Maeda et al. | 455/528 |
| 5,233,641 | 8/1993 | Maeda | 455/567 |
| 5,337,356 | 8/1994 | Shinozaki | 455/567 |
| 5,355,516 | 10/1994 | Herold et al. | 455/510 |
| 5,495,517 | 2/1996 | Ide et al. | 455/567 |
| 5,581,802 | 12/1996 | Erickson et al. | 455/510 |

Primary Examiner—Edward F. Urban
Attorney, Agent, or Firm—Richard A. Sonnentag

[57] ABSTRACT

A controllable playback device is placed in a mobile station (125) which is capable of playing a recorded announcement to the user of the mobile station (125) when activated by the infrastructure equipment of the cellular communication system. The cellular communication system determines if a voice channel is available (506), and if unavailable, an estimate of a retry time period is performed (512). After the estimate of the retry time period, the system forms and sends a message to the mobile station (125) including the retry estimate (515). The mobile station (125) receives the message, and activates the controllable playback device to announce to the user of the mobile station (125) that the system is fully loaded and that an access attempt at a time related to the retry estimate would likely be successful.

12 Claims, 7 Drawing Sheets

METHOD AND MOBILE STATION FOR ACTIVATING A PLAYBACK DEVICE IN A COMMUNICATION SYSTEM

FIELD OF THE INVENTION

The present invention relates generally to communication systems and, more particularly, to activation of a playback device in mobile stations within such communication systems.

BACKGROUND OF THE INVENTION

When a cellular system is operating at or near capacity, the mobile stations are likely to experience trouble accessing the system because a communication channel is not available at that time. To notify the mobile station that a communication channel is not available, a "fast busy" signal is supplied to the user of the mobile station. This indicates to the user of the mobile station that access is currently being denied, and that an attempt to access the communication channel at a later time is necessary. The user's typical response is to immediately try to gain access to a communication channel, and if denied, the process continues (perhaps indefinitely). When this occurs, the user of the mobile station can become frustrated, while the infrastructure within the communication system supports the extra burden of this connection process. Thus a need exists for an improvement to this potentially frustrating and burdensome process during communication channel access.

DETAILED DESCRIPTION OF A PREFERRED EMBODIMENT

A controllable playback device is placed in a mobile station which is capable of playing a stored announcement to the user of the mobile station when activated by the infrastructure equipment of the cellular communication system. The cellular communication system determines if a voice channel is available, and if unavailable, an estimate of a retry time period is performed. After the estimate of the retry time period, the system forms and sends a message to the mobile station including the retry estimate. The mobile station receives the message, and activates the controllable playback device to announce to the user of the mobile station that the system is fully loaded and that an access attempt at a time related to the retry estimate would likely be successful.

In a preferred embodiment of the present invention, a base-station compatible with a communication system receives a signal from the mobile station requesting access to a communication channel and determines if a communication channel is available for use by the mobile station. If a communication channel is unavailable, the base-station then estimates a retry time period corresponding to a time when another access attempt by the mobile station would likely be successful then sends a message which includes the estimate of the retry time period, to the mobile station. At the mobile station, the message sent by the base-station, including the estimate of the retry time period, is received and the playback device is activated such that a user of the mobile station is informed that an access attempt at a time related to the retry estimate would likely be successful. The estimate of the retry time period corresponding to a time when another access attempt by the mobile station would likely be successful is based on factors such as the number of other mobile stations attempting access, the past call hold time distribution notified to the other mobile stations, the number of voice channels available in the particular cell or a combination of such factors. The communication system can either be an analog communication system, a time-division multiple access (TDMA) communication system or a code-division multiple access (CDMA) communication system.

In an alternate embodiment, a playback device is activated in a communication system, the playback device coupled to a mobile station compatible with the communication system, the communication system in communication with a plurality of mobile stations. The following steps are performed at a base-station in communication with a portion of the plurality of mobile stations: determining an offending mobile station out of the portion of the plurality of mobile stations based on the amount of degradation it contributes to an overall communication system degradation; estimating a hold time period corresponding to a time when the offending mobile station would contribute less to the overall communication system degradation; and sending a message, including the estimate of the hold time period, to the mobile station. The following steps are performed at the mobile station: receiving the message, including the estimate of the hold time period, sent by the base-station; and activating the playback device such that a user of the offending mobile station is informed that the communication associated with the offending mobile station will be placed on hold for a time related to the hold time period estimate. The step of estimating a hold time period corresponding to the time when an offending mobile station will be placed on hold is based on factors such as the number of other mobile stations attempting access, the past call hold time distribution notified to the other mobile stations, the number of voice channels available in the particular cell, the number of mobile stations currently using the system, etc.

In an alternate embodiment the playback device is activated in a communication system, the playback device coupled to a mobile station compatible with the communication system, implementing the following steps at a base-station compatible with the communication system: receiving a signal from the mobile station requesting access to a communication channel; determining if a communication channel is available for use by the mobile station; if a communication channel is unavailable, estimating a queue time period corresponding to a time when a communication channel is likely to become available; and sending a message, including the estimate of the queue time period, to the mobile station. The following steps are performed at the mobile station: receiving the message, including the estimate of the queue time period, sent by the base-station; and activating the playback device such that a user of the mobile station is informed that a communication channel is likely to become available within a time related to the queue estimate. The step of estimating a queue time period corresponding to a time when a communication channel is likely to become available is based on factors such as the number of other mobile stations attempting access, the past call hold time distribution notified to the other mobile stations, the number of voice channels available in the particular cell or a combination of such factors. In this embodiment, the base-station further processes the step of: storing the number of the destination received from the mobile station; and connecting the mobile station with the station associated with the dialed number after the time related to the queue estimate.

To implement the various embodiments, a mobile station comprises a receiver front-end for demodulating messages transmitted by a base-station to produce demodulated messages and a processing function, coupled to the receiver front-end, for processing the demodulated messages. The mobile station further includes a playback device, coupled to the processing function, for audibly informing a user of the mobile station of certain conditions related to the communication system based on the processed demodulated messages. The playback device audibly informs a user of the mobile station of retry/hold/queue time estimates based on estimates of retry/hold/queue time periods. The content of the announcement played to the user can be variable depending on the content of the message received from the BSC within the base-stations and may even be downloadable via messaging from the base-stations.

Figure 1:
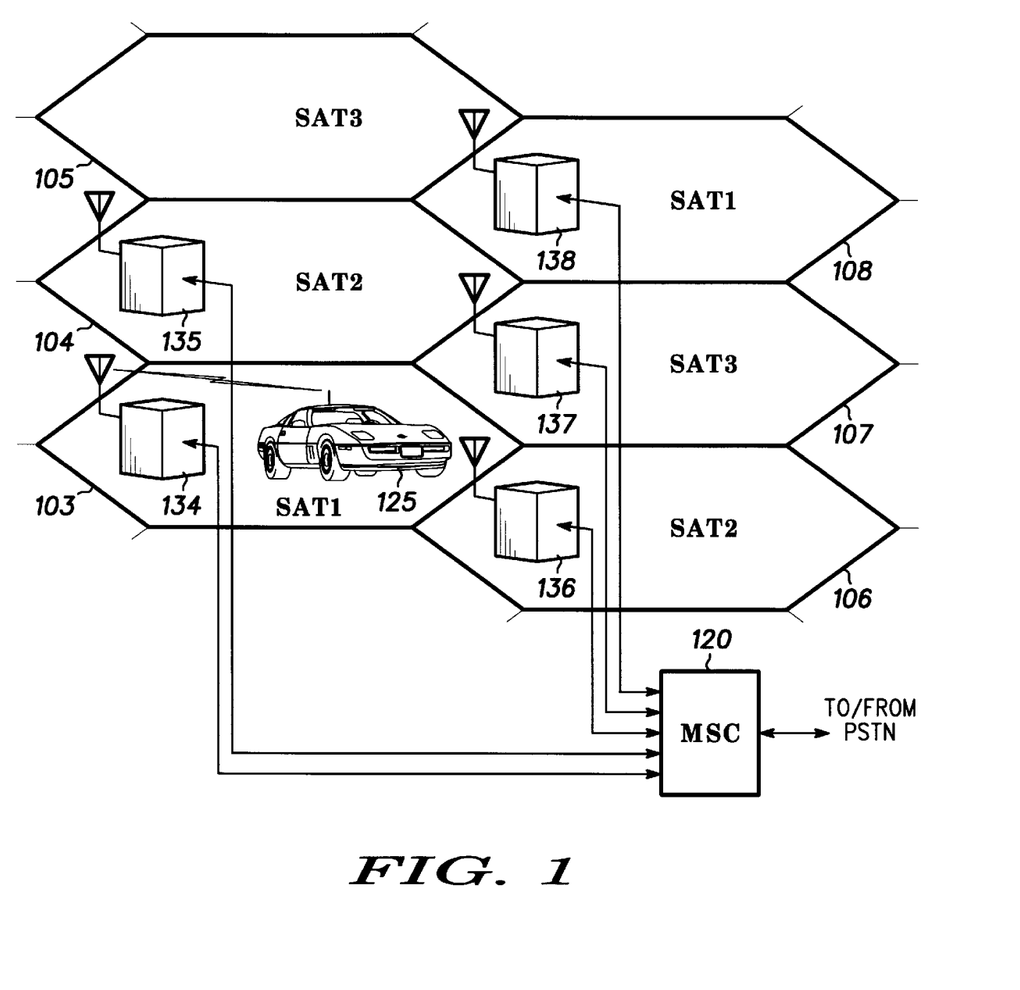
FIG. 1 generally depicts base-stations coupled to a MSC in a communication system that may be used to beneficially employ the present invention.

Referring to FIG. 1, a communication system, and more specifically a cellular communication system, is depicted. In the cellular communication system of FIG. 1, base-stations 134–138 are shown coupled to a mobile switching center (MSC) 120. Each base-station is located within a cell 103–108. In the preferred embodiment, the cellular communication system is analog system such as the Advanced Mobile Phone System (AMPS) implemented in the United States, but one of ordinary skill in the art will appreciate that the invention can be applied to any type of communication, including (but not limited to) time-division multiple access (TDMA) communication systems and code-division multiple access (CDMA) communication systems.

In FIG. 1, the base-station 134 is in wireless communication with a mobile station 125 via an analog channel. The cellular communication system forward channels (from base-stations to the mobile station 125) consist of voice channels, channels for paging and communication of system overhead information. In the case of a CDMA wireless communication system, a synchronization channel, and a pilot channel that is used for handoff purposes and phase tracking by the mobile station receiver system are also present. With reference to the problem solved by the invention, the voice channels are the communication channels which are unavailable to the user of the mobile station 125, thus leading to the problems discussed above.

Figure 2:
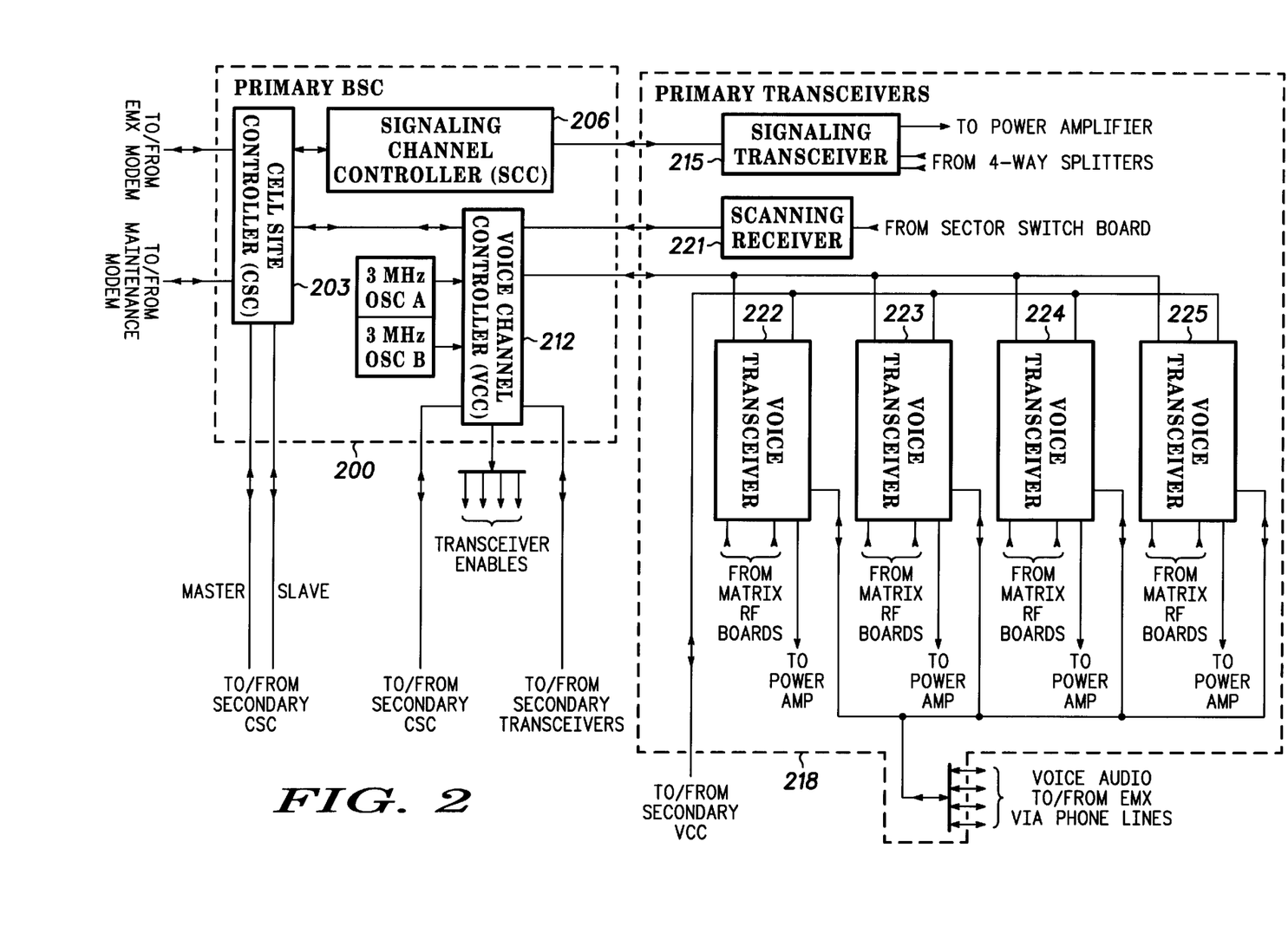
FIG. 2 generally depicts in block form a base-station controller (BSC) and transceivers located within the base-stations of FIG. 1.

Each base-station 134–138 includes a plurality of transmitters and receivers for operating on at least one duplex signalling channel and a plurality of duplex voice channels. One conventional system employs transmitters and receivers of the type described in Motorola Instruction Manual No. 68P81058E05-A published by Motorola Service Publications, Schaumburg, Ill., in 1989. FIG. 2 generally depicts transceivers and associated controlling hardware found within the base-stations 134–138. As shown in FIG. 2, a base-site controller (BSC) 200 typically consists of four circuit-cards and provides the interface between base-stations 134–138 and the MSC 120. A BSC 200 is comprised of a cell-site controller (CSC) 203, a voice channel controller (VCC) 212, a signalling channel controller (SCC) 206, and an extend multiple port interface (EMPI) (not shown). An identical secondary set of cards can be employed to provide BSC redundancy. Together, these cards provide voice channel assignment, signalling channel control, performance monitoring, and other control functions that are used by the MSC 120 to initiate calls, determine channel allocation, and make handoff decisions associated with the cellular communication system.

Figure 3:
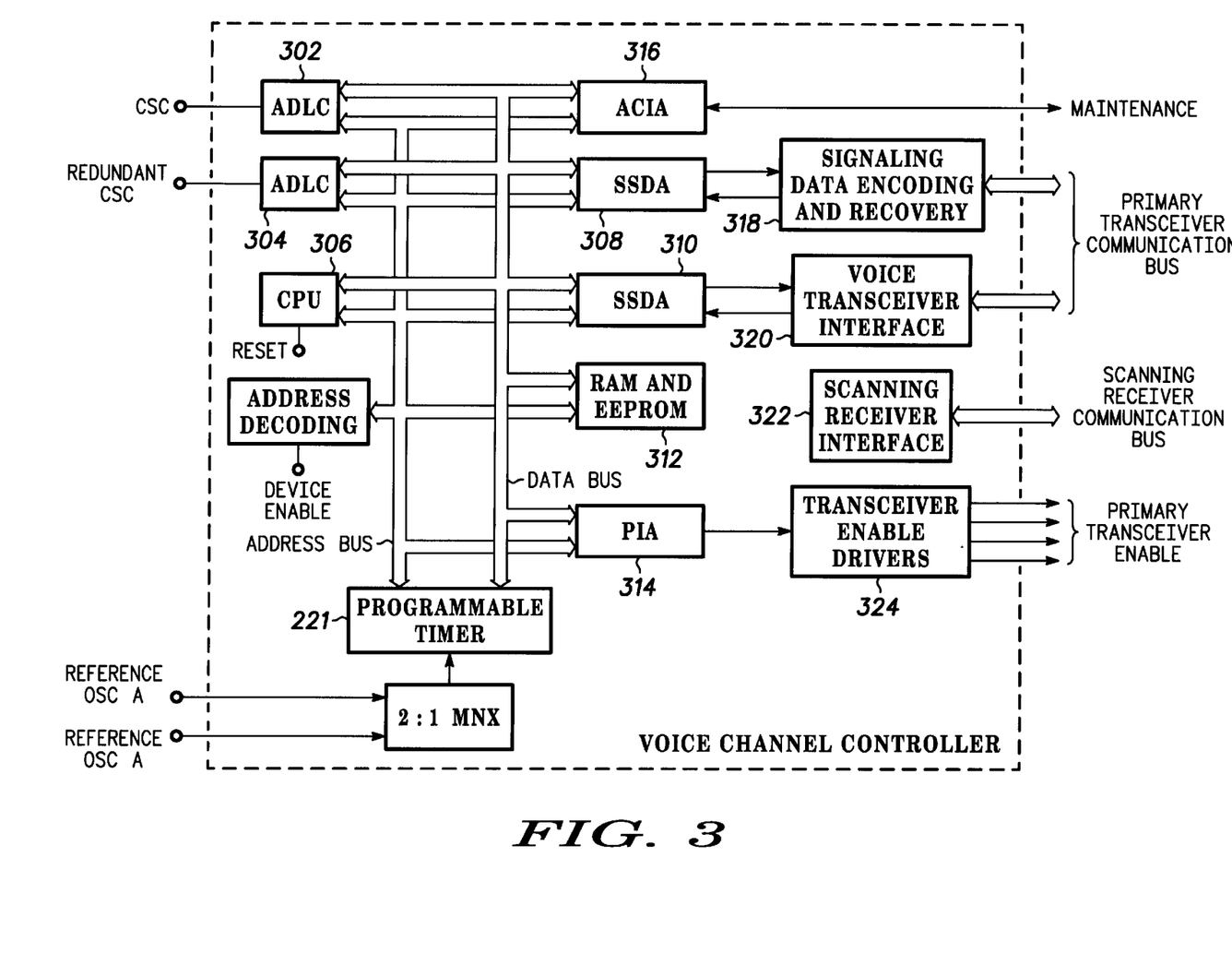
FIG. 3 illustrates a voice channel controller (VCC) located within the BSC of FIG. 2 and used to control the scanning and voice transceivers found in FIG. 2.

VCC 212 controls the primary voice transceivers 222–225 and the scanning receiver 221. FIG. 3 generally depicts a block diagram of a VCC 212 which may be employed to implement the present invention. The central processing unit (CPU 306) may be a microprocessor such as MC6809 available from Motorola, Inc. This CPU 306 is used to control the primary voice channel transceivers 222–225 and scanning receiver(s) 221 in accordance with programmed steps stored in RAM and EPROM 312. In a non-redundant configuration of the present invention, VCC 212 may control up to 30 channels of radio equipment and one scanning receiver employing SSDA 310, voice transceiver interface 320, and scanning receiver interface 322. Signalling data encoding and decoding is controlled via SSDA 308 and signalling encoding and recovery interface 318. Transceivers are selected by enable drivers 324 which is controlled by CPU 306 via peripheral interface adapters (PIA) 314. In the redundant configuration requiring two VCCs, each transceiver (being dual ported) can communicate with both VCCs. Under normal operating conditions, each VCC actively controls half of the channels while exchanging control and status messages with the other half. Interface to a redundant CSC is accomplished via ADLC 304.

Figure 4:
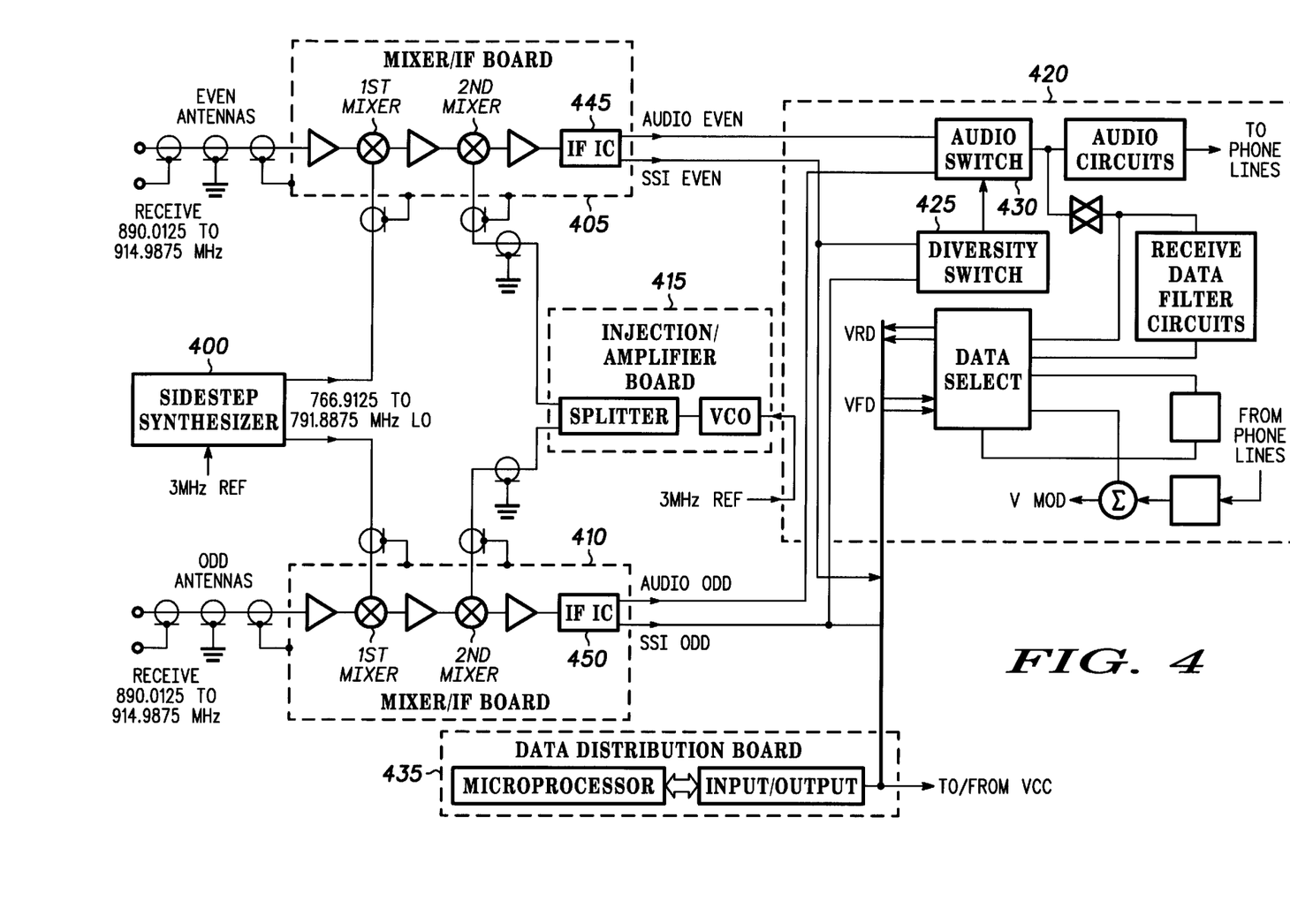
FIG. 4 generally depicts a schematic diagram of a receiver employed in the base-stations of FIG. 1.

In the cellular communication system described above, a transmitted narrowband analog signal from the mobile station 125 3 0 enters one of voice transceivers 222–225 via a matrix RF board (not shown) or enters a scanning receiver 221 via a sector switch board (not shown). FIG. 4 generally depicts a schematic diagram of receiver hardware employed to demodulate the transmitted narrowband signal and determine a signal quality value or signal strength indication (SSI) of the signal. Referring to FIG. 4, the receiver has as input an even and odd signal for diversity reception purposes. An even mixer/IF board 405 accepts the even signal while an odd mixer/IF board 410 accepts the odd signal. Both mixer/IF boards 405, 410 have an input from a side-step synthesizer 400 which acts as a first local oscillator (LO) for mixing purposes. An injection/amplifier board 415 provides another input to each mixer/IF board 405, 410 and acts as a second LO for mixing purposes. The IF ICs 445, 450, which in the preferred embodiment are part number TDA 1576 available from Signetics, provide limiting, quadrature detection, and amplification to yield an audio output signal which is further amplified and fed to a audio control board 420 for processing the narrowband signal. SSI detection is performed by circuitry internal to the IF ICs 445, 450 and by discrete SSI detection range extension circuitry.

The outputs of IF ICs 445, 450 individually provide linear SSI signals. These SSI signals are fed to the audio control board 420 where they are used to drive a diversity switch 425, which in turn is used to enable/disable an audio switch 430. Output from the audio switch 430 is the audio which represents the communication from the subscriber 125. This audio is output to AMPS MSC 120 via conventional phone lines.

In the cells 103–108, a scanning receiver 221 located within the base-stations 134–138 receive signals via antennas and front-end equipment. A scanning receiver 221 within the base-stations 134–138 makes measurements on mobile stations using the system, such as mobile station 125, which are potential candidates for handoff, and report these measurement results to the next highest device in the cell-site control hierarchy, which in the preferred embodiment is the MSC 120.

As stated above, when the user of the mobile station 125 is unable to access a particular base-station because other mobile stations are using the available resources, typically a "fast busy" signal is supplied to the user indicating a system access retry is necessary. To eliminate the problems associated with this situation, a controllable playback device is placed in the mobile station 125 which is capable of playing a recorded announcement (RANN) to the user of the mobile station 125 when activated by the infrastructure equipment of the cellular communication system in accordance with the invention. The content of the RANN can be variable depending on the content of the message received from the BSC 200 within the base-stations 134–138 and may even be downloadable via messaging from the base-stations.

Figure 5:
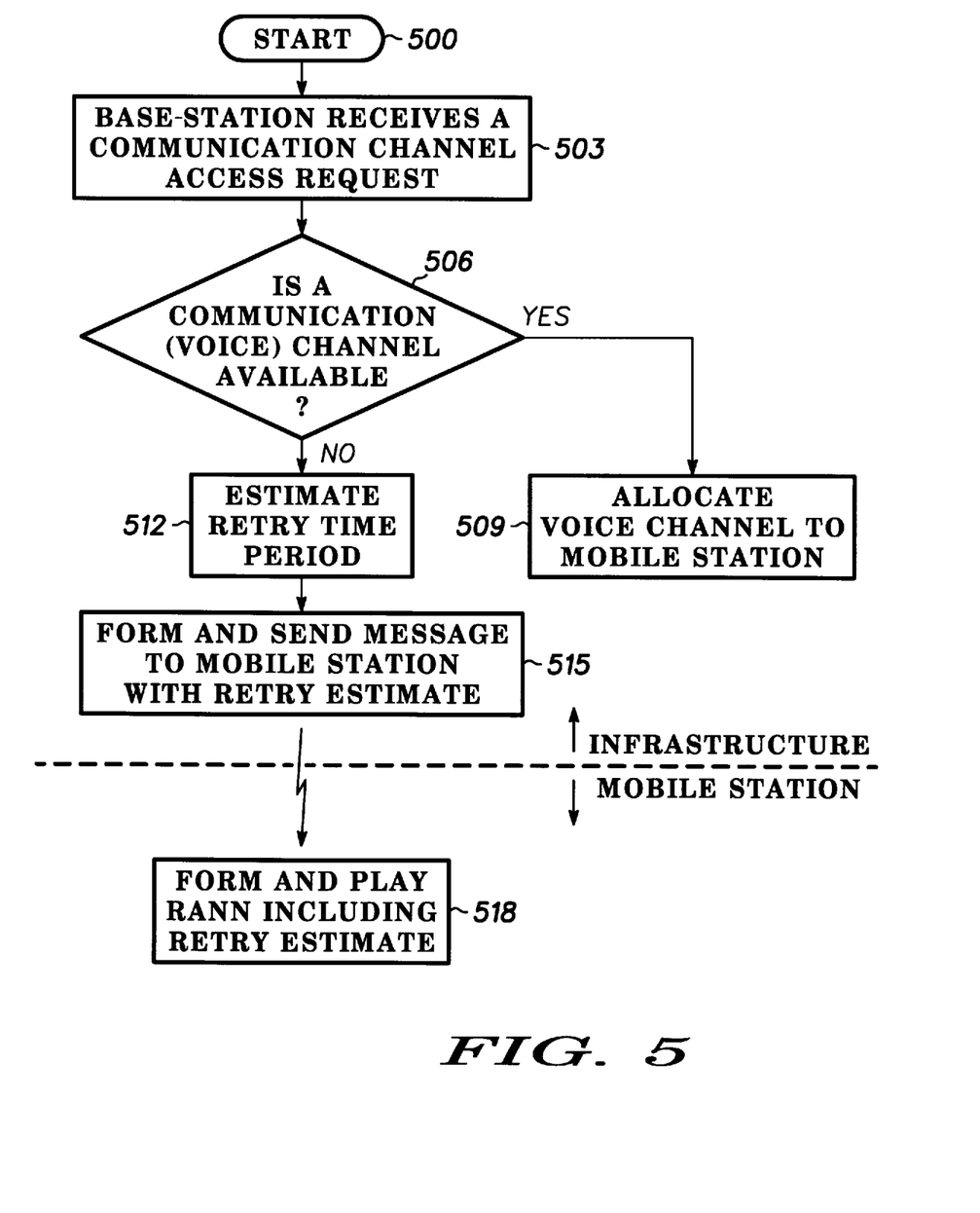
FIG. 5 generally depicts a flow diagram performed when a communication channel access occurs in accordance with the invention.

FIG. 5 generally depicts a flow diagram performed in the base-stations 134–138 when a communication channel access occurs in accordance with the invention. As shown in FIG. 5, the flow starts at block 500 and progresses to block 503 where a base-station 134–138 receives a request to access a communication channel. In this embodiment, the communication channel is a voice channel, but the invention can be readily applied to other types of channels which may be unavailable to a user. Continuing, a test is next performed at block 506 to determine if a voice channel is available for use by the mobile station 125. If a voice channel is available, then the voice channel is allocated to the mobile station 125 as shown in block 509.

If a voice channel is unavailable for allocation to the mobile station 125, then an estimate of a retry period is made at block 512. The estimate of the retry period is based on a combination of factors, including the number of other mobile stations attempting access, the past call hold time historically experienced by other mobile stations, the number of voice channels available in the particular cell, etc. When the retry period estimate is completed, the system then forms and sends a message, including the retry period estimate, to the mobile station. Note that all steps to this point have occurred within the infrastructure equipment of the cellular communication network. When the mobile station 125 receives the message, the controllable playback device within the mobile station 125 is activated and the user of the mobile station 125 is notified that the cellular communication system is currently fully loaded, and that a retry in X minutes would probably be successful. Since the frustrating connection process associated with the prior art is eliminated, both the user of the infrastructure-controlled RANN in accordance with the invention and the cellular infrastructure system benefit.

Figure 6:
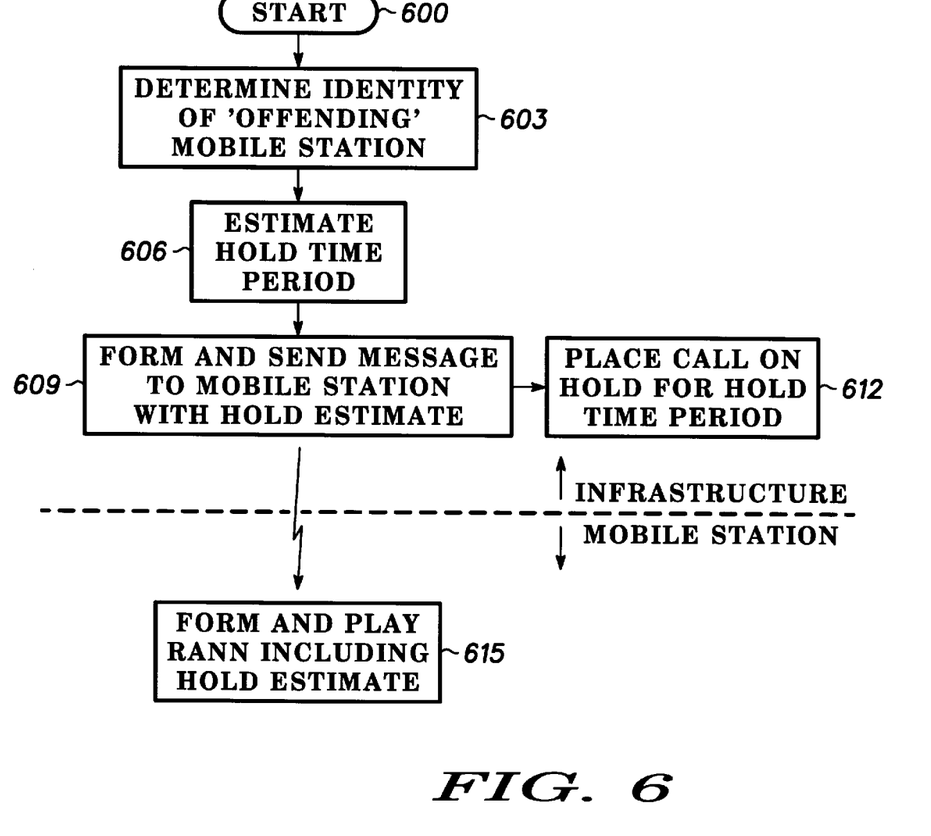
FIG. 6 generally depicts a flow diagram performed to identify and mitigate the effects of an offending mobile station in accordance with an alternate embodiment of the invention.

The playback device in the mobile station 125 in accordance with the invention can be beneficially utilized during an active call as well. System performance may be improved by deferring calls determined or suspected to be causing excess adjacent or co-channel interference. FIG. 6 generally depicts a flow diagram performed to identify and mitigate the effects of an "offending" mobile station 125 in accordance with another embodiment of the invention.

Referring to FIG. 6, the process starts at 600 and flows to step 603 where the infrastructure equipment determines the identity of the "offending" mobile station 125. Again, the mobile station 125 is in an active call at this point. Next, the infrastructure equipment estimates a hold time period at step 606. The hold time period, in this case, may be based on an empirically observed value or how long it typically takes for a subscriber to move sufficiently so as to no longer be presenting an interference condition. The infrastructure equipment next forms and sends the message, including the hold time period estimate, to the mobile station 125 at step 609. At step 612, the infrastructure equipment places the call on hold for the time period related to the hold time period estimate. In parallel, at step 615, the mobile station 125 receives the message and plays an announcement to the user of the mobile station 125 informing the user that the call has been placed on hold for Y minutes, where Y is the hold time period estimate.

At this point, the channel that was in use by the offending mobile station 125 can be allocated to other mobile stations which do not disrupt the system. In a CDMA system, such as a system operating in accordance with a IS-95 CDMA system, the offending mobile station 125 continues to monitor pilot signals of the serving and target base-stations 134–138. If the serving base-station confirms that a better channel is available after the hold time period, the call is re-established to the offending mobile station 125. If the offending mobile station 125 determines during the hold time period that a target base-station would provide better communication service, a handoff from the serving base-station to the target base-station is initiated and the call re-established on the target base-station. In this situation, the user of the offending mobile station 125 is given the opportunity to maintain the call instead of simply being dropped altogether.

The concept described above with reference to FIG. 6 has a dramatic effect in code-division multiple access (CDMA) communication systems, where a single offending user can cause severe system problems due the "self noise generated interference limit" of the system. For example, in CDMA communication systems, the number of users that can be supported by the system (or some group of cells and sectors) is determined by the transmitted power of the mobile station and the base-station. Mobile stations which require more than say 150 milliwatts of transmitted power on the reverse link or greater than 1 watt of transmitted power on the forward link are increasing the noise in the system as perceived by other subscribers in their vicinity. In a system with blocking, new calls are denied service when certain thresholds (perhaps power allocation or number of user thresholds) are crossed. By implementing the flow diagram depicted in FIG. 6, the number of users which can be served with reasonable voice quality in a CDMA communication system is greatly increased. For this CDMA situation, the load thresholds may include the reverse link noise rise, the forward link power allocation, the number of calls connected, etc. All of these thresholds are checked at step 603 in FIG. 6 to determine the identity of the "offending" mobile station.

In situations where the communication channel for an offending mobile station must be released (commonly referred to as "dropped"), the flowchart of FIG. 5 can be used to inform the offending mobile station when a call connection is likely to be successful. For example, when an offending CDMA mobile station has been put on hold using the flowchart of FIG. 6, and a soft-handoff request is denied, the offending CDMA mobile station must be dropped. However, instead of simply dropping the offending CDMA mobile station without any warning, the offending CDMA mobile station can be informed, using the flowchart depicted in FIG. 5 in accordance with the invention, that a retry in X minutes would probably be successful. It should be noted that this information is provided to the user without using valuable traffic channel capacity.

Figure 7:
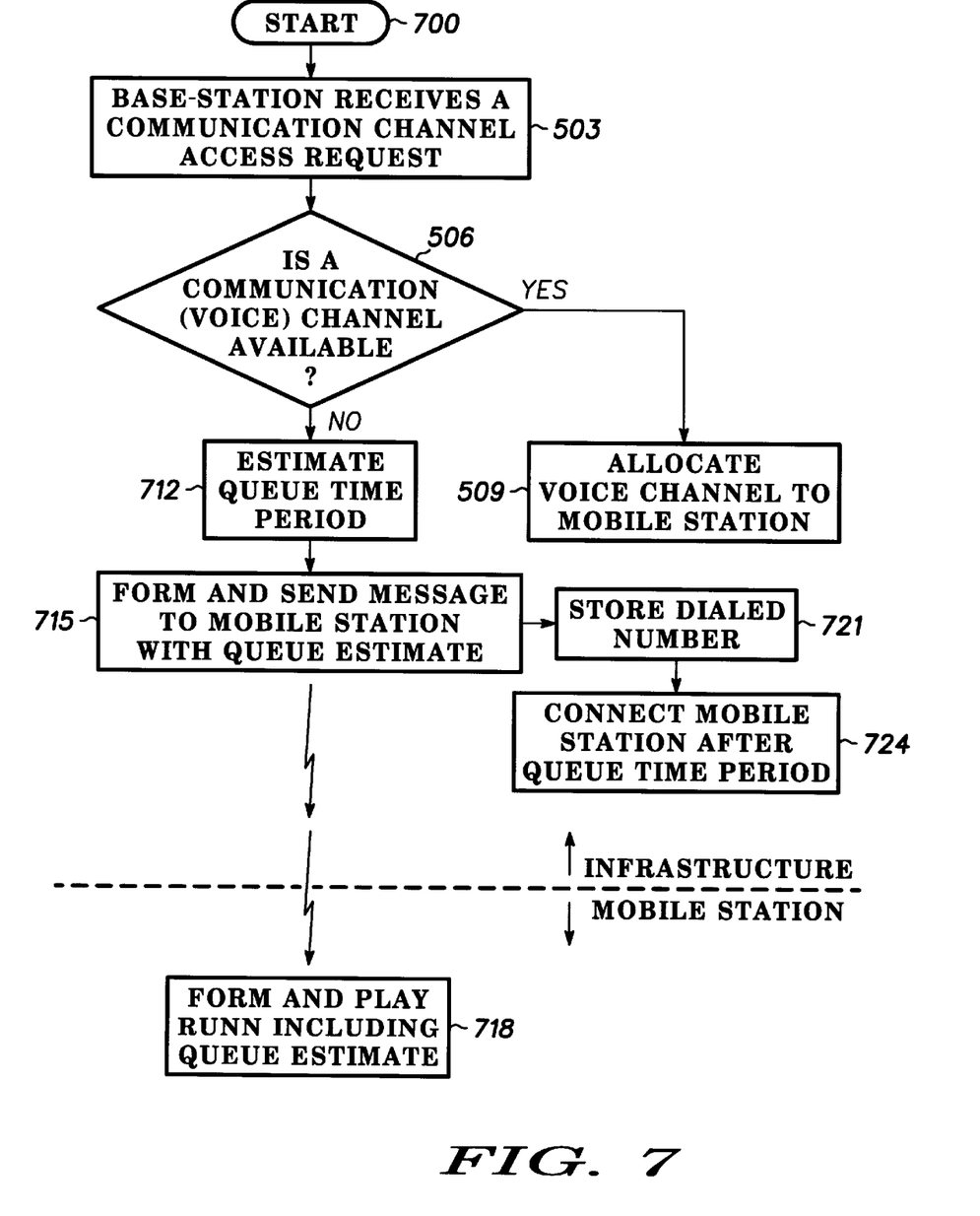
FIG. 7 generally depicts a flow diagram of queuing a communication channel access in accordance with an alternate embodiment of the invention.

In another implementation of controlling a playback device in a mobile station in accordance with the invention, an access request is queued and stored as shown in FIG. 7. Referring to FIG. 7, the flow starts at block 700 and progresses to blocks 503, 506 and 509, which are the same as shown with reference to FIG. 5.

If a voice channel is unavailable for allocation to the mobile station 125 in this embodiment, an estimate of a queue time period is made at block 712. The queue time period is based on the same factors as the retry time period, namely the number of other mobile stations attempting access, the past call hold time distribution notified to or utilized by the other mobile stations, the number of voice channels available in the particular cell, etc. At step 715, a message including the queue time is formed and sent to the mobile station 125. At step 718, the mobile station 125 receives the message including the queue time, and plays a message to the user of the mobile station 125 informing the user that the system is currently fully loaded, but that the call will be connected in Z minutes, where Z is related to the queue time period.

As the message at block 715 is being formed and sent, the infrastructure equipment stores the dialed number of the destination at block 721. At block 724, the infrastructure equipment automatically connects the station (either fixed or mobile) associated with the dialed number to the mobile station 125. In this embodiment, the user of the mobile station 125 need not attempt a retry since the infrastructure equipment will automatically reconnect after Z minutes (related to the queue time period). It is important that the user of the mobile station be informed that automatic connection will occur, so that the unnecessary burden caused by repeated access attempts is not placed on the communication system.

Figure 8:
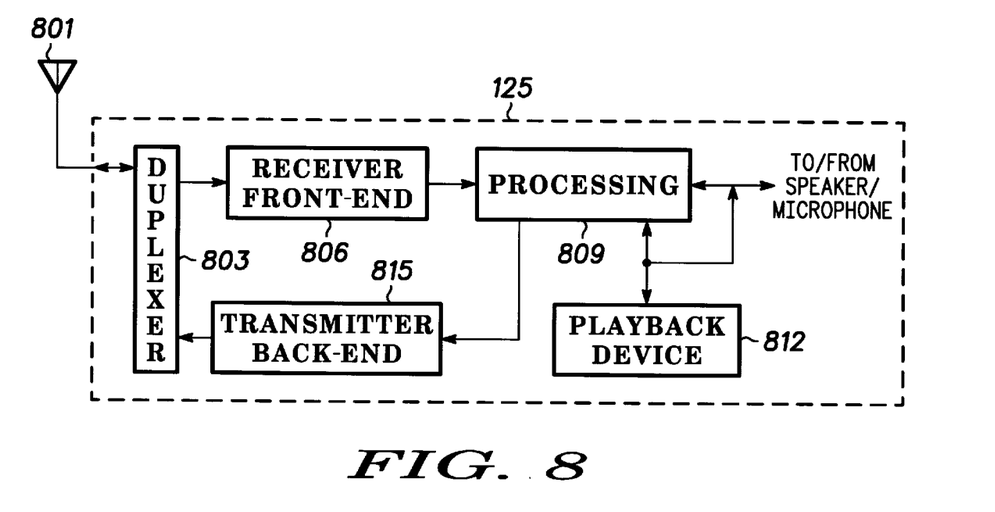
FIG. 8 generally depicts, in block diagram form, a mobile station including a playback device in accordance with the invention.

FIG. 8 generally depicts, in block diagram form, a mobile station including a playback device in accordance with the invention. As shown in FIG. 8, an antenna 801 receives and transmits messages entering and exiting the mobile station 125. When receiving messages including the retry/hold/queue time period estimates, the antenna 801 passes the messages to a duplexer which properly transfers the messages to the receiver front-end 806. In the preferred embodiment, the receiver front-end 806 is essentially the same as the base-station receiver shown in FIG. 4. The receiver front-end 806 demodulates the messages including the retry/hold/queue time period estimates, and transfers the demodulated message to the processing block 809. The processing block 809 performs the processing necessary to interpret the message, and based on the interpretation, forwards either the retry/hold/queue time period estimates to the playback device 812. The playback device 812 audibly informs the user of the mobile station 125 of the current situation (either retry/hold/queue) based on the particular message. The audible information from the playback device 812 is sent to the speaker (not shown) of the mobile station 125 so that the user can hear the desired message.

While the invention has been particularly shown and described with reference to a particular embodiment, it will be understood by those skilled in the art that various changes in form and details may be made therein without departing from the spirit and scope of the invention. For example, one of ordinary skill in the art will appreciate that control of a playback message in accordance with the invention could be beneficially employed in emergency situations where a current user of a communication channel must be temporarily placed on hold so that an emergency call can be placed by another user of the system. The corresponding structures, materials, acts and equivalents of all means or step plus function elements in the claims below are intended to include any structure, material, or acts for performing the functions in combination with other claimed elements as specifically claimed.

What we claim is:

1. A method of activating a playback device in a communication system, the playback device coupled to a mobile station compatible with the communication system, the method comprising the steps of:

at a base-station compatible with the communication system:

receiving a signal from the mobile station requesting access to a communication channel;

determining if a communication channel is available for use by the mobile station;

if a communication channel is unavailable, estimating a retry time period corresponding to a time when another access attempt by the mobile station would likely be successful; and sending a message, including the estimate of the retry time period, to the mobile station;

at the mobile station:

receiving the message, including the estimate of the retry time period, sent by the base-station; and activating the playback device such that a user of the mobile station is informed that an access attempt at a time related to the retry estimate would likely be successful.

2. The method of claim 1, wherein the step of estimating a retry time period corresponding to a time when another access attempt by the mobile station would likely be successful is based on factors such as the number of other mobile stations attempting access, the past call hold time distribution notified to the other mobile stations, the number of voice channels available in the particular cell or a combination of such factors.

3. The method of claim 1, wherein the communication system further comprises either an analog communication system, a time-division multiple access (TDMA) communication system or a code-division multiple access (CDMA) communication system.

4. A method of activating a playback device in a communication system, the playback device coupled to a mobile station compatible with the communication system, the communication system in communication with a plurality of mobile stations, the method comprising the steps of:

at a base-station in communication with a portion of the plurality of mobile stations:

determining an offending mobile station out of the portion of the plurality of mobile stations based on the amount of degradation it contributes to an overall communication system degradation;

estimating a hold time period corresponding to a time when the offending mobile station would contribute less to the overall communication system degradation; and sending a message, including the estimate of the hold time period, to the mobile station;

at the mobile station:

receiving the message, including the estimate of the hold time period, sent by the base-station; and activating the playback device such that a user of the offending mobile station is informed that the communication associated with the offending mobile station will be placed on hold for a time related to the hold time period estimate.

5. The method of claim 4, wherein the step of estimating a hold time period corresponding to the time when an offending mobile station will be placed on hold is based on factors such as the number of other mobile stations attempting access, the past call hold time distribution notified to the other mobile stations, the number of voice channels available in the particular cell, the number of mobile stations currently using the system, etc.

6. The method of claim 4, wherein the communication system further comprises either an analog communication system, a time-division multiple access (TDMA) communication system or a code-division multiple access (CDMA) communication system.

7. A method of activating a playback device in a communication system, the playback device coupled to a mobile station compatible with the communication system, the method comprising the steps of:

at a base-station compatible with the communication system:

receiving a signal from the mobile station requesting access to a communication channel;

determining if a communication channel is available for use by the mobile station;

if a communication channel is unavailable, estimating a queue time period corresponding to a time when a communication channel is likely to become available; and sending a message, including the estimate of the queue time period, to the mobile station;

at the mobile station:

receiving the message, including the estimate of the queue time period, sent by the base-station; and activating the playback device such that a user of the mobile station is informed that a communication channel is likely to become available within a time related to the queue estimate.

8. The method of claim 7, wherein the step of estimating a queue time period corresponding to a time when a communication channel is likely to become available is based on factors such as the number of other mobile stations attempting access, the past call hold time distribution notified to the other mobile stations, the number of voice channels available in the particular cell or a combination of such factors.

9. The method of claim 7, wherein the base-station further processes the step of:

storing the number of the destination received from the mobile station; and connecting the mobile station with the station associated with the dialed number after the time related to the queue estimate.

10. A mobile station for use in a communication system comprising:

a receiver front-end for demodulating messages transmitted by a base-station to produce demodulated messages;

a processing function, coupled to the receiver front-end, for processing the demodulated messages; and a playback device, coupled to the processing function, for audibly informing a user of the mobile station of retry/hold/queue time estimates based on estimates of retry/hold/queue time periods.

11. The mobile station of claim 10, wherein the content of an announcement is variable depending on the content of the message received.

12. The mobile station of claim 10, wherein the content of an announcement is downloadable via messaging from the base-stations.

* * * * *